Figure 1:
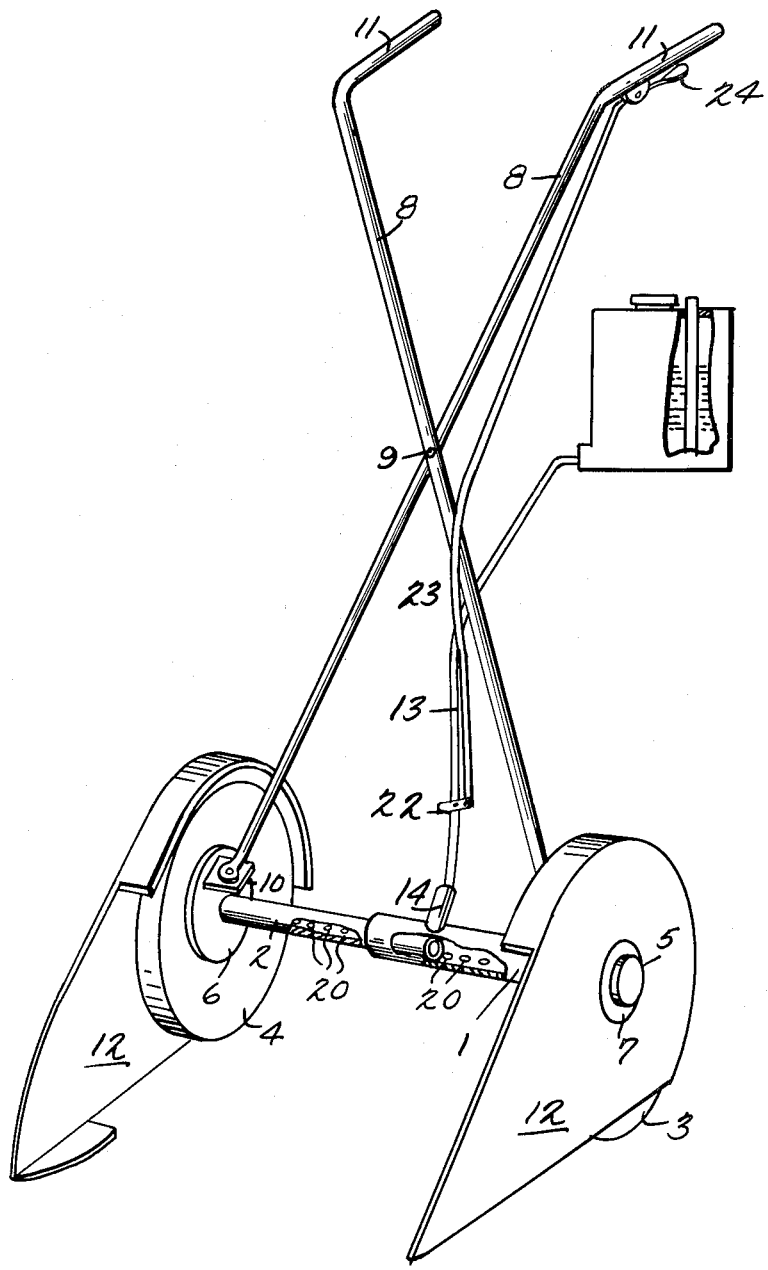

March 1, 1966 R. WATTS 3,237,346
APPLICATOR FOR LIQUIDS

Filed June 17, 1963 3 Sheets-Sheet 1

INVENTOR
ROBERT WATTS

BY *Cushman, Darby & Cushman*
ATTORNEYS

March 1, 1966 R. WATTS 3,237,346
APPLICATOR FOR LIQUIDS
Filed June 17, 1963 3 Sheets-Sheet 3

INVENTOR
ROBERT WATTS

BY Cushman, Darby & Cushman
ATTORNEYS

United States Patent Office 3,237,346
Patented Mar. 1, 1966

3,237,346
APPLICATOR FOR LIQUIDS
Robert Watts, Fernhurst, near Haslemere, England, assignor to Imperial Chemical Industries Limited, London, England, a corporation of Great Britain
Filed June 17, 1963, Ser. No. 288,118
2 Claims. (Cl. 47—1.7)

This invention relates to an applicator for liquids, and in particular it relates to an applicator for the application of liquid weedkiller to the ground between the rows of growing plants.

In one aspect, the invention consists in an applicator for the application of liquid weedkiller to the ground between rows of growing plants, comprising a distributor having means for connection with a supply of liquid and having a plurality of discharge orifices for the liquid, adjustable means for limiting the number of orifices from which liquid can discharge and thereby regulating the effective width of the distributor, and means by which the distributor can be moved over the ground.

The distributor can conveniently be a perforated tube in telescopic arrangement with a plunger as the adjustable means, whereby the number of orifices or perforations in the tube from which liquid can discharge is dependent upon the extent to which the tube and plunger are telescoped together. It has been found that a very convenient arrangement is one in which instead of the plunger there is used a second perforated tube. In this latter arrangement telescoping of the tubes not only results in a reduction of the number of effective discharge orifies, but also permits discharge of liquid along the length of the distributor as liquid can flow from orifices in both tubes. If desired, the distributor may be made up of two or more such arrangements mounted together, or a single tube may be provided with two or more plungers (or tubes) in telescopic arrangement therewith and moving within different zones of the main distributor tube.

The means for moving the distributor over the ground may be, in particular, a handle by which it can be pushed over the ground. For preference, the handle of the applicator comprises a pair of arms pivoted together at or near their middle in a scissors arrangement, the arms at one end being carried by the respective outer ends of the distributor tubes or plungers and at their other ends providing two spaced handle pieces, the amount by which the tubes are telescoped together being adjustable in accordance with adjustment of the distance separating the handle pieces. The handle pieces are conveniently in the shape of a pair of bicycle handle bars so that they can comfortably be gripped by the operator and used for guiding the applicator over the surface of the ground. The handle pieces may be made integral with the arms, or may be in the form of handles if desired.

The applicator can be carried on wheels, and in particular, the wheels may be mounted on the outer ends of the telescoping distributor members so that the wheel track of the applicator may be adjusted simultaneously with the width of the distributor. Alternatively, the applicator may be carried on runners as is more fully described in our co-pending U.K. specification No. 44,005/61. The runners may be mounted in a similar manner to wheels.

When wheels are used, these may be of any form which can provide an adequate grip on the ground, and they may be mounted by any convenient form of bearing or pivot which is considered appropriate for reasons of cost or efficiency.

The means for connection to a supply of liquid weedkiller may comprise a conduit or tube communicating with the perforated tube, most conveniently at or near its midpoint. Such a conduit and/or tube may be connected with any convenient source or reservoir of the liquid weedkiller, preferably through a valve or regulator.

Although primarily, and advantageously, adapted for use by hand, the applicator of my present invention may be provided with power assistance if desired.

The applicator of this invention is particularly suitable for the application of bipyridylium quaternary salt herbicides, for example 1,1'-ethylene-2,2'-bipyridylium dichloride and dibromide, and 1,1'-dimethyl-4,4'-bipyridylium di(methylsulphate) and dichloride.

Figure 2:
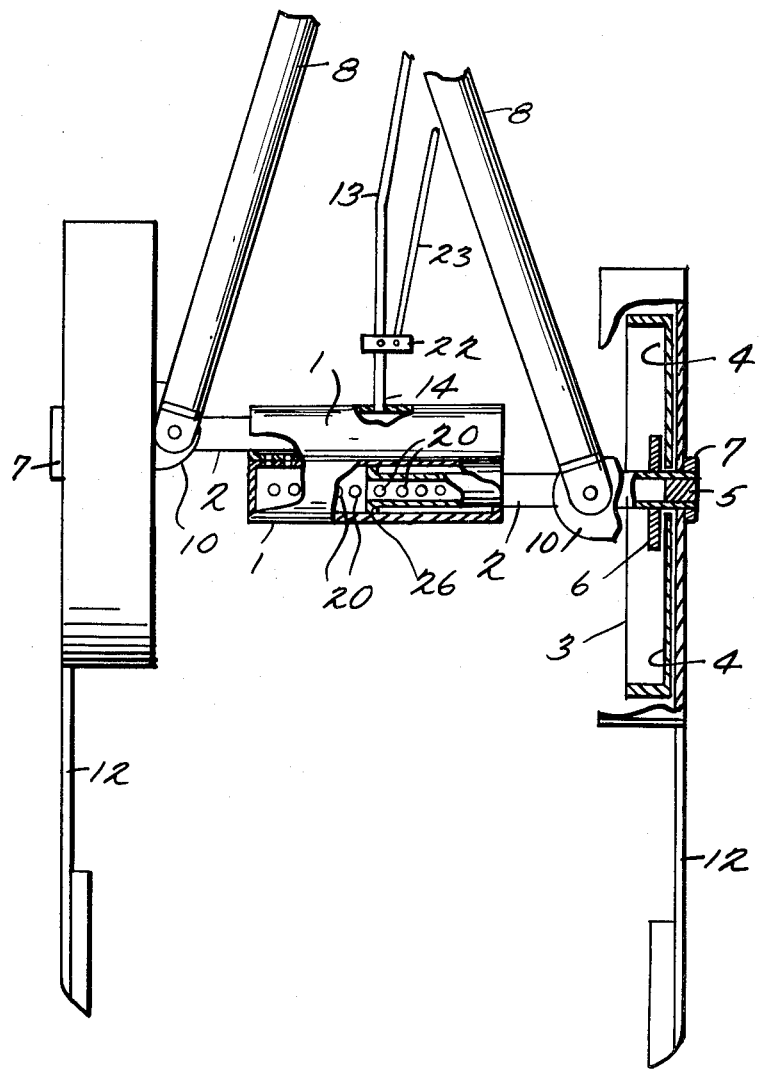
Figure 3:
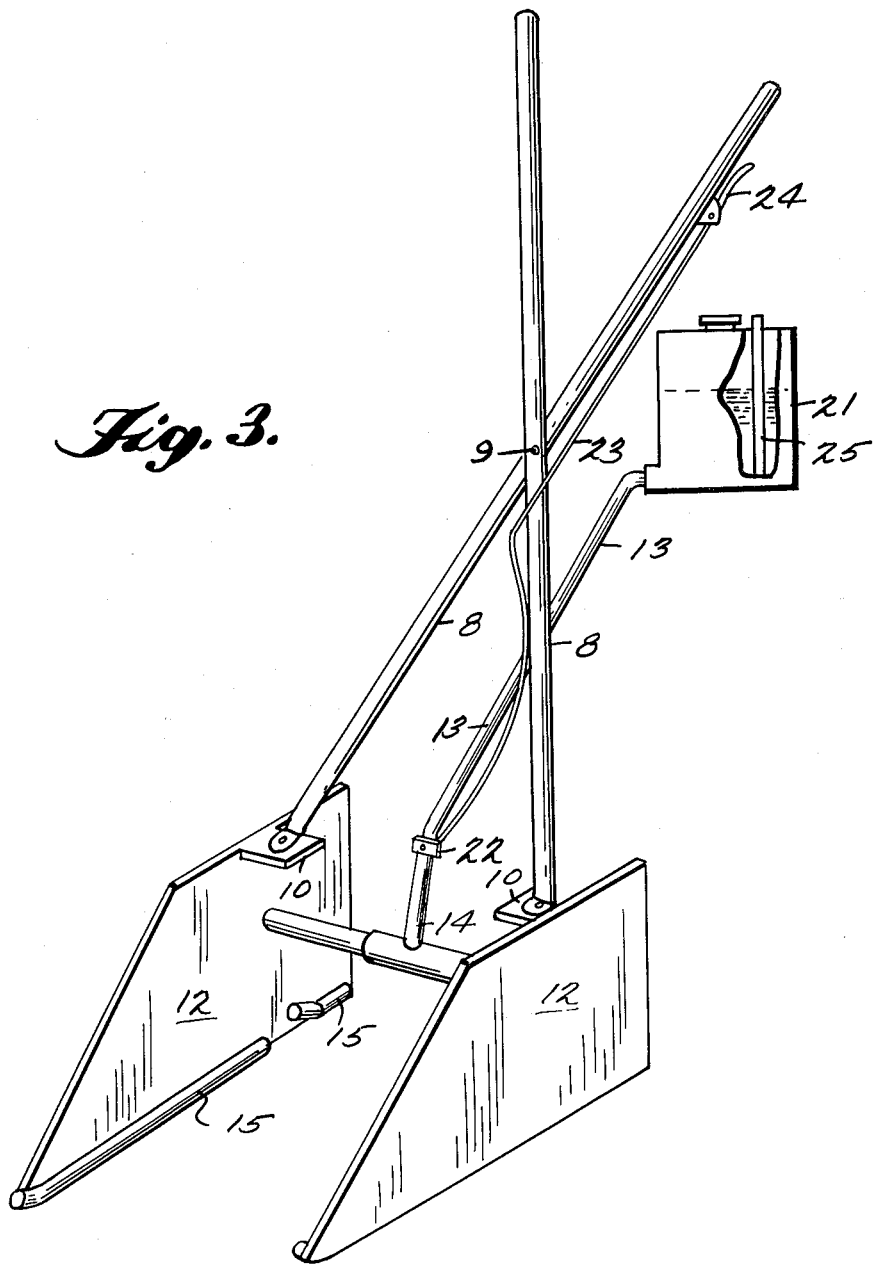

The invention is illustrated but not limited by reference to the following drawings in which:

FIGURE 1 is a perspective view of a wheeled embodiment of the applicator with parts broken away to expose details otherwise hidden from view;

FIGURE 2 is a fragmentary top plan view of a modified embodiment similar to that shown in FIGURE 1 but having two telescoping perforated tube arrangements mounted together, parts of the embodiment being broken away and sectioned to expose details otherwise hidden from view; and FIGURE 3 is a perspective view similar to FIGURE 1, showing an applicator according to the invention having runners rather than wheels.

The following description, based on FIGURES 1 and 2, relates to the construction and operation of a preferred embodiment of our invention. In this description, suitable measurements are given but variations from these can be made if desired.

The applicator has a distributor consisting of two straight metal tubes 1 and 2, each 18 inches long and in telescopic arrangement one within the other. The outer tube 1 has an internal diameter of 3/4 inch and the inner tube 2 which can slide within the outer, has an external diameter of 1/2 inch and an internal diameter of 3/8 inch. Each of the distributor tubes has along its length a row of discharge orifices 20 spaced 1/4 inch apart, each orifice having a diameter of 1/32 inch. Telescoping of the tubes results in successive orifices of the inner of the two tubes becoming covered by the outer tube, and thereby reducing the number of effective orifices of the distributor.

The outer ends of the tubes are closed and each carry a wheel 3 of about 6 inches diameter. Each wheel consists of a metal disc 4 which is mounted for rotation on a boss 5 fixed over the end of the tube. The wheel is retained on the boss between a flange 6 carried by the inner end of the boss 5 and a retaining collar 7 fixed over the outer end of the boss 5. Thus the distributor constitutes a fixed axle for the two land wheels which is aproximately 3 inches above the surface of the ground when in use. A handle by which the applicator can be pushed over the ground consists of a pair of arms 8, each 3 1/2 feet long, pivoted together approximately midway along their length in a scissors arrangement by pivot 9 and each attached at one end to a bracket 10 carried by each of the flanges of the bosses on which the wheels are mounted. The ends of the pair of arms distant from the tubes provide a pair of spaced handle pieces 11 in the shape of a pair of bicycle handle bars by means of which the applicator can be pushed and steered over the ground. The amount by which the distributor tubes are telescoped together and thus the effective length of the distributor can readily be adjusted by moving together the two handle pieces or by moving them further apart. When the two handle pieces are moved towards each other the pair of arms move on their common pivot 9 and the ends of the arms distant from the handle pieces move together by a corresponding amount, thereby increasing the amount by which the distributor tubes are telescoped together and reducing the effective width of the distributor. Conversely, movement apart of the handle pieces causes the other ends of the arms to move further apart, thereby reducing the amount by which the tubes are telescoped together and increasing the effective width of the distributor. Manual adjustment of the effective width of the distributor by such adjustment of the distance between the handle pieces can be achieved as the applicator is being pushed over the ground and enables weedkiller to be applied between adjacent rows of growing plants where—as often is the case—the rows are not exactly parallel, but converge and diverge along their length.

The distributor also has a pair of shield plates 12 mounted on the wheel retaining collar 7 so that they lie outside the wheels, to shield the foliage of row plants from weedkiller discharging from the distributor on to the wheels and then being thrown off the wheels. The shield members 12 are preferably so shaped as to assist in the deflection of foliage of the row plants away from the distributor.

The handle of the applicator carries a length of flexible (e.g. rubber) tubing 13 attached at one end to a supply conduit 14 in the outer of the two distributor tubes and suitable for connection at the other end to a convenient reservoir of liquid weedkiller 21. The flexible tube passes through a valve 22, which is most conveniently a pinch-point operated by means of a Bowden cable 23 extending to a control 24 on one of the handle pieces, by means of which supply of weedkiller to the distributor can be shut off when desired.

The reservoir for the weedkiller is conveniently a knapsack tank having a "constant head" device which ensures that the weedkiller is fed to the distributor at a constant rate. In one instance this constant head device is provided by a vent pipe 25 which extends from the top of the otherwise air-tight tank almost to the bottom of the tank. This arrangement ensures that liquid flowing from the tank does so under a "constant head" pressure which corresponds to the height between the distributor and the lower end of the vent pipe.

The modified embodiment shown in FIGURE 2 includes two telescoping tube arrangements 1, 2 mounted in partially coextensive relationship so that the outer tubes 1 are adjacent one another generally centrally of the applicator and the inner tubes 2 extend toward the shield plates 12. A plunger as referred to hereinbefore is indicated at 26.

The applicator illustrated in FIGURE 3 is carried on runners 15 fitted to the undersides of the shield plates 12 and providing a bearing surface on the ground.

In use, the supply tank is first connected with the distributor by way of the supply pipe and filled with the liquid weedkiller, the pinch-point valve being in the closed position. The applicator is then wheeled towards the ends of the rows of sugar beet plants; and then the effective length of the distributor (and consequently the distance between the wheels) is adjusted by manipulation of the handle pieces so that the applicator can be wheeled between the two adjacent rows without the wheels damaging the plants, yet sufficiently close to them to enable weedkiller to be applied to as great a width as possible between the rows. The pinch-point valve is then opened, whereupon weedkiller flows through the rubber tube from the tank to the supply conduit of the distributor, through the distributor tubes and discharges by way of the distributor orifices on to the ground between the rows of sugar beet plants. As the applicator is wheeled down the rows, the distance between its wheels (and thus also the effective length of the distributor) can be manually adjusted by means of the handle pieces as may be required by any divergence of the rows from the parallel. The shield members meanwhile protect the leaves of the row plants from weedkiller discharging from the distributor which might otherwise fall on them.

The various parts of the applicator may be made of materials having properties appropriate to the conditions of fabrication and use concerned. The distributor tubes, for example, are conveniently made of a material which is relatively soft and easily worked (e.g. copper); the handles and arms, and any parts subjected to appreciable wear can be made of steel. The arms are conveniently made from metal tubing.

What I claim is:

1. An applicator for the application of liquid weedkiller to the ground between adjacent rows of growing plants comprising:

a distributor for dispensing liquid weedkiller toward the ground, said distributor including at least one pair of telescoping tubes, said tubes having a plurality of discharge orifices directed toward the ground;

conduit means connected to said distributor and to a source of liquid weedkiller for conveying weedkiller to said distributor;

a pair of ground engaging elements for facilitating movement of the distributor over the ground, each ground engaging element being separately attached to opposite ends of a pair of said telescoping tubes, so as to place said ground engaging elements at opposite lateral ends of the distributor; and a pair of elongate arms for guiding said applicator and for adjusting the width of the applicator, said pair of elongate arms having first ends separately connected to said pair of ground engaging elements, and having ends opposite said first ends which define handles movable toward and away from one another, said pair of elongate arms being pivotally joined to one another intermediate the ends of said pair of arms, whereby movement of said handles toward and away from one another pivots said arms about a pivot point so as to regulate the width of the applicator and the ground engaging elements of said applicator.

2. An applicator as set forth in claim 1 and including a foliage shield mounted on each of said ground engaging elements, each shield being configured to shield the foliage of the plants in the rows between which the applicator is moved.

References Cited by the Examiner

UNITED STATES PATENTS

| 378,672 | 2/1888 | Gathright | 239—165 |
|---|---|---|---|
| 381,986 | 5/1888 | Collins | 239—541 |
| 1,188,131 | 6/1916 | Agee | 239—150 |
| | | | 47—1.7 X |
| 2,534,367 | 12/1950 | Perrotta | 280—35 |

FOREIGN PATENTS

| 459,155 | 8/1913 | France. |
|---|---|---|
| 489,066 | 8/1918 | France. |
| 1,001,698 | 10/1951 | France. |
| 331,639 | 1/1921 | Germany. |
| 863,864 | 1/1953 | Germany. |
| 584,049 | 1/1947 | Great Britain. |

ABRAHAM G. STONE, *Primary Examiner.*

T. GRAHAM CRAVER, *Examiner.*